United States Patent
Kuri et al.

(10) Patent No.: US 9,506,805 B2
(45) Date of Patent: Nov. 29, 2016

(54) PRINTING APPARATUS

(71) Applicant: Seiko Epson Corporation, Tokyo (JP)

(72) Inventors: Ryohei Kuri, Matsumoto (JP); Teruyuki Nishimura, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/972,608

(22) Filed: Dec. 17, 2015

(65) Prior Publication Data

US 2016/0176197 A1    Jun. 23, 2016

(30) Foreign Application Priority Data

Dec. 22, 2014 (JP) ................................ 2014-258512

(51) Int. Cl.
| | |
|---|---|
| *B41J 29/393* | (2006.01) |
| *G01J 3/46* | (2006.01) |
| *G01J 3/26* | (2006.01) |
| *G01J 3/50* | (2006.01) |
| *G01J 3/51* | (2006.01) |
| *G01J 3/02* | (2006.01) |

(52) U.S. Cl.
CPC ............... *G01J 3/46* (2013.01); *G01J 3/0216* (2013.01); *G01J 3/26* (2013.01); *G01J 3/50* (2013.01); *G01J 3/51* (2013.01)

(58) Field of Classification Search
CPC .... B41J 29/393; B41J 2/2135; B41J 2/2132; B41J 2/1752; B41J 2/21; H04N 1/6033; H04N 1/6044

USPC ...................................... 347/14, 19; 358/1.9
See application file for complete search history.

(56) References Cited

U.S. PATENT DOCUMENTS

| | | | |
|---|---|---|---|
| 7,762,645 B2 * | 7/2010 | Miyahara | B41J 2/195 347/19 |
| 8,817,329 B2 * | 8/2014 | Satoh | G01J 3/462 358/1.9 |
| 2014/0218802 A1 | 8/2014 | Saito et al. | |
| 2016/0171348 A1 * | 6/2016 | Satoh | H04N 1/6033 347/110 |

FOREIGN PATENT DOCUMENTS

JP             2014-153386 A        8/2014

* cited by examiner

*Primary Examiner* — Jannelle M Lebron
(74) *Attorney, Agent, or Firm* — Harness, Dickey & Pierce, P.L.C.

(57) ABSTRACT

A printing apparatus includes: a discharging unit configured to discharge liquid onto a medium: a color measuring unit configured to measure a color of the medium on which the liquid has been discharged; a carriage on which the discharging unit and the color measuring unit are mounted; and a relative transporting unit configured to transport the medium and the carriage with respect to each other. The color measuring unit includes a variable wavelength interference filter configured to change a gap between reflecting films on substrates that face each other with the gap therebetween and shock-absorbing members are provided between the carriage and the color measuring unit.

4 Claims, 3 Drawing Sheets

WHILE COLOR MEASUREMENT IS NOT PERFORMED

WHILE COLOR MEASUREMENT IS PERFORMED

PRINTING APPARATUS

BACKGROUND

1. Technical Field

The present invention relates to, for example, a printing apparatus having a colorimetric function.

2. Related Art

A variable wavelength interference filter having a pair of substrates which are arranged so as to face each other with a predetermined gap therebetween and are provided respectively with reflecting films on surfaces thereof facing each other is known. The variable wavelength interference filter is configured to cause incoming light to be multiply-reflected at the two reflecting films and to be emitted as light having a specific wavelength corresponding to a distance of the gap. An optical filter device in which such a variable wavelength interference filter is packaged is also known (See JP-A-2014-153386, for example).

In contrast, a printing apparatus having a discharging unit and the optical filter device described above, which are mounted on a carriage, is also proposed. The printing apparatus has both a function of forming an image by causing the discharging unit to discharge liquid such as ink while moving a medium P and the carriage relatively to each other, and a colorimetric function of measuring colors of an image formed on the medium P.

However, the gap described above is on the order of several hundreds of nanometers, and is very narrow. Therefore, a problem has been pointed out in the printing apparatus described above. That is, for example, when oscillations caused by a movement of the carriage or impacts applied during a transportation of the printing apparatus are propagated to the variable wavelength interference filter of the optical filter device, the above-described gap cannot be controlled precisely, and consequently breakdown and erroneous operation may occur.

SUMMARY

An advantage of some aspects of the invention is that a technique which reduces breakdown or erroneous operation of a variable wavelength interference filter caused by oscillations or impacts is provided.

According to an aspect of the invention, a printing apparatus includes: a discharging unit configured to discharge liquid onto a medium; a color measuring unit configured to measure a color of the medium on which the liquid has been discharged; a carriage on which the discharging unit and the color measuring unit are mounted; and a relative transporting unit configured to transport the medium and the carriage with respect to each other. The color measuring unit includes a variable wavelength interference filter configured to change a gap between reflecting films on substrates that face each other with the gap therebetween and a shock-absorbing member is provided between the carriage and the color measuring unit.

According to the printing apparatus of the aspect described above, oscillations and impacts applied to the carriage are absorbed by the shock-absorbing member provided between the carriage and the color measuring unit. Therefore, breakdown and erroneous operation of the color measuring unit, specifically, of the variable wavelength interference filter are reduced.

The shock-absorbing member is configured to absorb oscillations of the carriage, and may be, for example, an elastic member such as a sponge, a spring, or a rubber, may be a viscous member such as gel, and may be a fluid such as sol. For example, an air suspension using elasticity of compressed air is also applicable.

In the printing apparatus of the aspect described above, it is preferable that the shock-absorbing member be provided on a plane intersecting a direction of change of the gap. In this configuration, oscillations and impacts in a direction of the change of the gap are absorbed by the shock-absorbing member.

In the printing apparatus of the aspect described above, it is preferable that the shock-absorbing member be provided on a plane intersecting a scanning direction of the carriage. In this configuration, oscillations and impacts in a direction of transport of the carriage are absorbed by the shock-absorbing member.

In the printing apparatus of the aspect described above, it is preferable that the printing apparatus further include an actuator configured to fix the color measuring unit at a predetermined position with respect to the carriage while color measurement is performed with the color measuring unit. In this configuration, while the color measurement is not performed, breakdown and erroneous operation of the color measuring unit are reduced. In contrast, while the color measurement is performed, an improvement of accuracy of the color measurement is achieved by setting the color measuring unit at a predetermined position with respect to the carriage.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
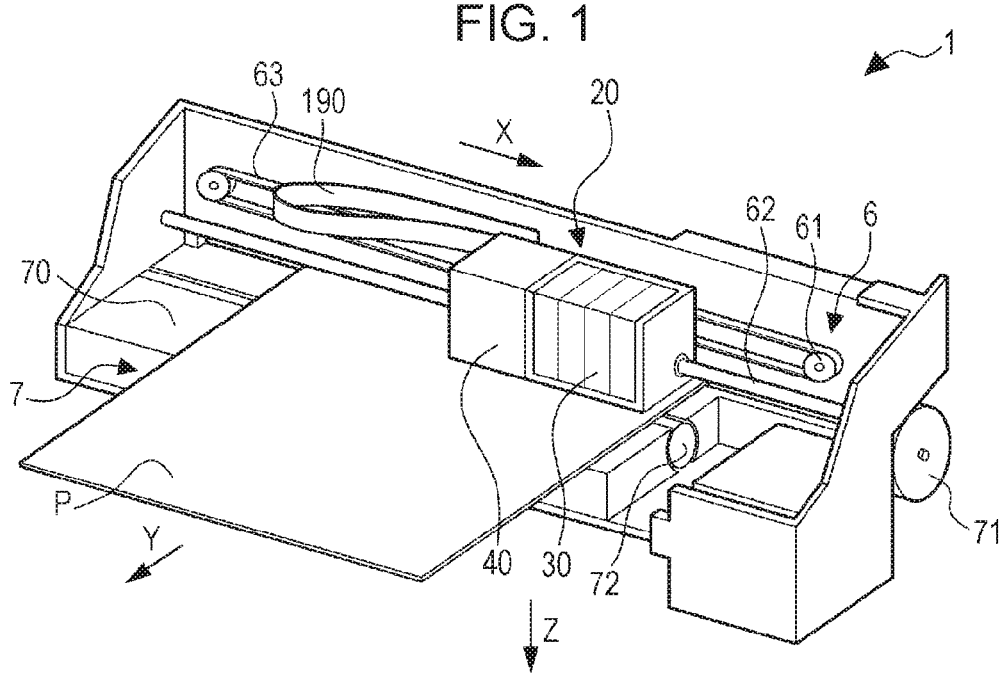
FIG. 1 is a drawing illustrating a schematic configuration of a printing apparatus of an embodiment.

FIG. 1 is a perspective view illustrating a schematic configuration of a printing apparatus.

As illustrated in FIG. 1, a printing apparatus 1 includes a transporting mechanism 6 (relative transporting unit) configured to transport (reciprocate) a carriage 20 in a primary scanning direction (X-direction).

The transporting mechanism 6 includes a carriage motor 61 configured to move the carriage 20, a carriage guide shaft 62 whereof both ends are fixed, and a timing belt 63 extending substantially parallel to the carriage guide shaft 62 and being driven by the carriage motor 61.

The carriage 20 is supported by the carriage guide shaft 62 so as to be reciprocable and is fixed to part of the timing belt 63. Therefore, when the timing belt 63 is moved normally and reversely by the carriage motor 61, the carriage 20 reciprocates by being guided by the carriage guide shaft 62.

The carriage 20 includes a discharging unit 30 and a color measuring module 40 mounted thereon. The discharging unit 30 includes a plurality of nozzles configured to discharge ink individually in a Z-direction on a portion facing a medium P such as paper. The discharging unit 30 is divided into roughly four blocks for color printing. The individual blocks discharge ink in black (Bk), cyan (C), magenta (M), and yellow (Y), respectively.

The color measuring module 40 is an assembly including a color measuring unit configured to measure colors of an image (color chart) formed on the medium P and an actuator configured to transport the color measuring unit with respect to the carriage 20 as described later.

The carriage 20 is configured to receive various control signals and the like from a main board (not illustrated) via a flexible cable 190.

The printing apparatus 1 is provided with a transporting mechanism 7 configured to transport the medium P on a platen 70. The transporting mechanism 7 includes a transporting motor 71 which corresponds to a driving source, and a transporting roller 72 configured to be rotated by the transporting motor 71 and transport the printing medium P in a secondary scanning direction (Y-direction).

In this configuration, ink is discharged from the nozzles of the discharging unit 30 in accordance with printing data while the carriage 20 performs primary scanning, and an operation of transporting the medium P with the transporting mechanism 7 is repeated. Consequently, an image (including characters, diagrams, and color charts) is formed on a surface of the medium P.

The printing apparatus 1 includes a colorimetric function of measuring colors of the color chart formed on the medium P in accordance with predetermined print data. The colorimetric function is used, for example, for calibration such that colors indicated by measured data match colors defined by the predetermined print data.

In this embodiment, the primary scanning is performed by transporting the carriage 20. However, the primary scanning may be performed by transporting the medium P, and also by transporting both of the carriage 20 and the medium P. Only relative transport of the medium P and the carriage 20 is essential.

Figure 2:
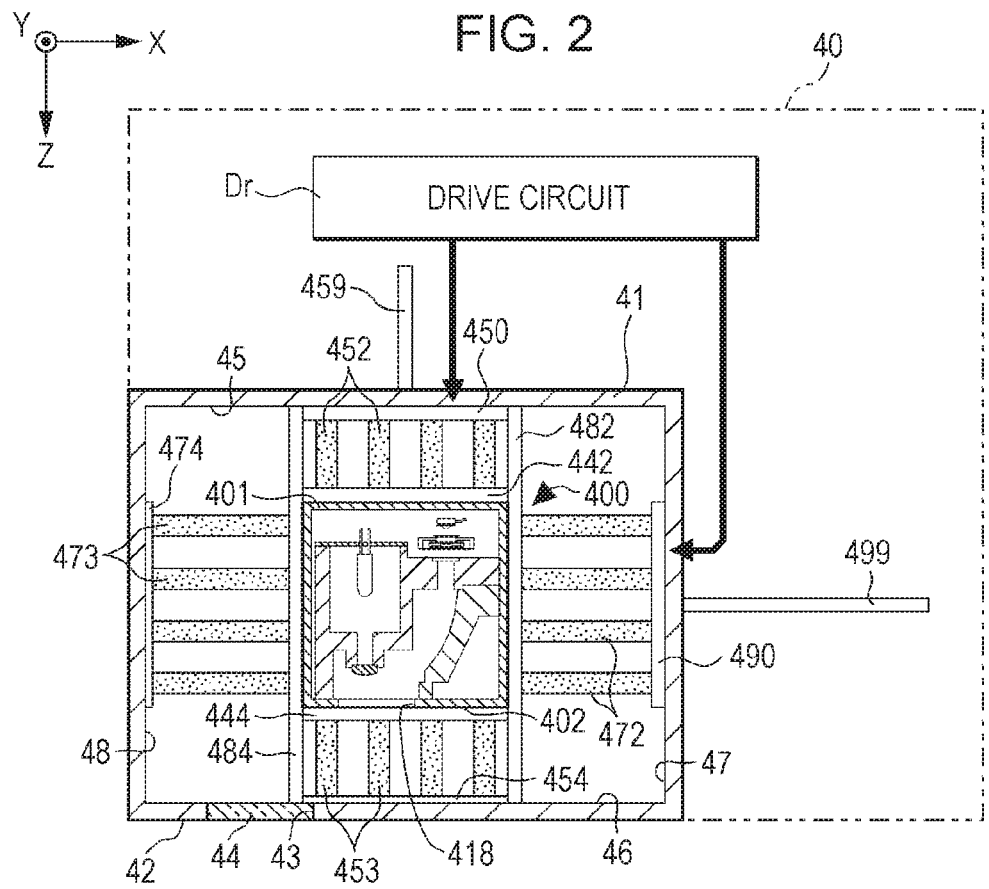
FIG. 2 is a drawing illustrating a configuration of a color measuring module.

FIG. 2 is a drawing illustrating a configuration of the color measuring module 40. FIG. 2 is a simplified cross-sectional view of the color measuring module 40 taken along an X-Z plane in FIG. 1.

The color measuring module 40 includes a hollow rectangular parallelepiped housing 41, and a color measuring unit 400 suspended in an interior of the housing 41. An opening 43 is provided on a surface 42 of the housing 41 facing the medium P and is fitted with a window member 44.

The color measuring unit 400 is a unit configured to measure colors of the medium P in the interior of the housing 41, and as will be described later, includes a rectangular parallelepiped case 401 and optical elements such as a light source and a light-receiving portion stored in the case 401. The color measuring unit 400 is suspended in the interior of the housing 41 as described below.

In FIG. 2, a holding plate 442 is mounted on an upper surface of the color measuring unit 400, and a holding plate 444 is mounted on a lower surface thereof. An actuator 450 is mounted on an inner surface 45 of the housing 41 so as to be transportable in the X-direction, and causes an operating member 459 to protrude toward a positive side in the Z-direction by driving a drive circuit Dr while the color measurement is performed. A plurality of shock-absorbing members 452 formed of a material such as sponge or urethane are provided between the actuator 450 and the holding plate 442. A slider 454 is mounted on an inner surface 46 of the housing 41 so as to be transportable in the X-direction. A plurality of shock-absorbing members 453 are provided between the slider 454 and the holding plate 444.

The number of the shock-absorbing members 452 and 453 is not limited to a plurality, and may be singular.

An actuator 490 is fixed to an inner surface 47 of the housing 41 and causes an operating member 499 to protrude toward a negative side in the X-direction by driving the drive circuit Dr while the color measurement is performed. A contact plate 482 is provided on the right side of the case 401 so as to be transportable in the X-direction along the inner surfaces 45 and 46. A plurality of shock-absorbing members 472 are provided between the contact plate 482 and the actuator 490. The contact plate 482 is held in contact with the right side surface of the case 401 by a biasing force of the shock-absorbing members 472.

A fixing plate 474 is fixed to an inner surface 48 of the housing 41, while a contact plate 484 is provided on the left side of the case 401 so as to be transportable along the inner surfaces 45 and 46 in the X-direction. A plurality of shock-absorbing members 473 are provided between the contact plate 484 and the fixing plate 474, and the contact plate 482 is held in contact with a right side surface of the case 401 by biasing forces of the shock-absorbing members 473.

The number of the shock-absorbing members 472 and 473 is not limited to a plurality, and may be singular.

The case 401 is only in contact with the contact plates 482 and 484. Therefore, while the color measurement is not performed, the case 401 remains at rest in the Z-direction at a point where a sum of gravity acting on the color measuring unit 400 and biasing forces of the shock-absorbing members 452 is balanced with biasing forces of the shock-absorbing member 453.

In contrast, as regards the X-direction, the case 401 is transportable in the X-direction together with the contact plates 482 and 484, the holding plates 442 and 444, the drive circuit Dr, the shock-absorbing members 452 and 453, and the slider 454. Therefore, while the color measurement is not performed, the case 401 remains at rest at a position where biasing forces of the shock-absorbing members 472 are balanced with biasing forces of the shock-absorbing members 473.

Figure 3:
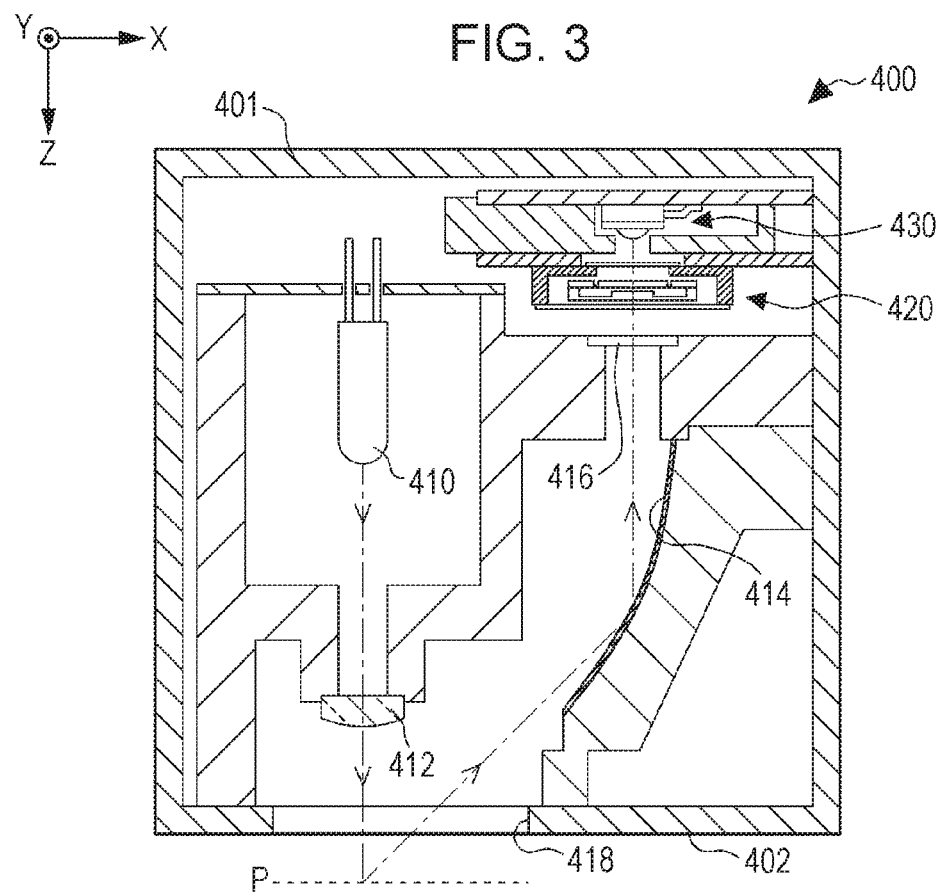
FIG. 3 is a drawing illustrating a configuration of a color measuring unit in the color measuring module.

FIG. 3 is a drawing illustrating a configuration of the color measuring unit 400, in particular, an optical route.

As illustrated in FIG. 3, the color measuring unit 400 includes a light source 410, a light collecting lens 412, a reflecting mirror 414, a band-pass filter 416, an optical filter device 420, and a light-receiving portion 430 in the case 401.

The light source 410 is, for example, a white LED and radiates light having a wavelength region that includes at least a wavelength region of a color to be measured. The light collecting lens 412 collects light radiated from the light source 410 via an opening 418 onto the medium P located at a position lower than a surface 402 while the color measurement is performed.

The reflecting mirror 414 is a concave mirror configured to reflect and collect part of light radiated from the light source 410 reflected from the medium P and passed through the opening 418 onto the optical filter device 420 and the light-receiving portion 430. The band-pass filter 416 blocks light that is reflected from the reflecting mirror 414 and that enters the optical filter device 420 other than light having a wavelength region of the color to be measured.

The optical filter device 420 includes two reflecting films having a variable gap therebetween, and allows part of light having a specific wavelength that has passed through the band-pass filter 416 to be transmitted therethrough by reflection and interference of the reflecting films. In the optical filter device 420, the gap between two reflecting films is controlled by a voltage of a drive signal, which is not illustrated.

The light-receiving portion 430, which is not specifically illustrated, includes a photodiode configured to convert light having a specific wavelength and transmitted through the optical filter device 420 into an electric current, and a converting circuit configured to convert the electric current converted by the photodiode into a voltage.

The drive signal to the optical filter device 420 is supplied from the main board described above via the flexible cable 190, while an output signal from the light-receiving portion 430 is supplied to the main board via the flexible cable 190. The drive signal and the output signal may be supplied or processed by a separate circuit of the carriage 20.

Figure 4:
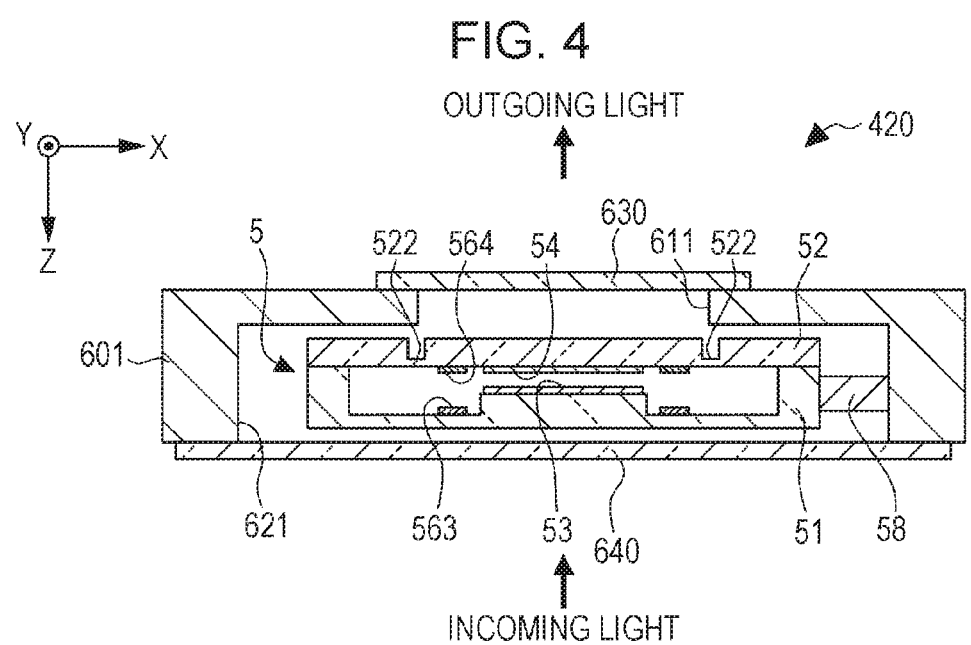
FIG. 4 is a drawing illustrating a configuration of an optical filter device in the color measuring unit.

FIG. 4 is a drawing illustrating a configuration of the optical filter device 420.

As illustrated in FIG. 4, the optical filter device 420 includes a housing 601 and a variable wavelength interference filter 5.

The housing 601 defines an internal space with a cover glass 640 which is to be mounted on a lower surface illustrated in FIG. 4. The housing 601 is provided with a light-transmissive hole 621 corresponding to a circular light-transmissive region in plan view (when viewed in the Z-direction), and the cover glass 640 having a diameter larger than that of the light-transmissive hole 621 is mounted on a lower outer surface thereof in FIG. 4.

The variable wavelength interference filter 5 includes a substrate 51 fixed to a side surface of the housing 601 via a holding member 58, and a substrate 52 joined to the substrate 51.

Both of the substrates 51 and 52 have a light transmitting property. The substrate 51 is provided with a reflecting film 53 on a surface facing the substrate 52 so as to include a center of a light-passing area and have a circular shape in plan view. In contrast, the substrate 52 is provided with a reflecting film 54 on a surface facing the substrate 51 so as to face the reflecting film 53 and maintain a gap therebetween. In order to increase reflectivity, a multilayer film or the like containing silver, an alloy containing silver as a main component, or in addition, $TiO_2$, $SiO_2$, amorphous Si, and the like is used for the reflecting films 53 and 54.

In the optical filter device 420, light entering from the cover glass 640 side is reflected repeatedly between the reflecting films 53 and 54, and light having a wavelength which is an integral multiple of a distance corresponding to twice the gap goes out to the cover glass 630 side.

In the optical filter device 420, the substrate 52 is provided with a diaphragm 522 outside of an area where the reflecting film 54 is provided in plan view, and on a surface opposite to the surface facing the substrate 51. The diaphragm 522 is formed so as to face an outer peripheral edge of a light-transmissive hole 611.

A ring-shaped electrode 564 is formed inside the diaphragm 522 and outside the reflecting film 54 in plan view of the substrate 52 facing the substrate 51. In the same manner, a ring-shaped electrode 563 is formed on the substrate 51 facing the substrate 52 so as to face the electrode 564.

The diaphragm 522 of the substrate 52 is more susceptible to bending than other portions. Therefore, an electrostatic attractive force is generated in accordance with a potential difference between the electrodes 563 and 564 by applying drive signals to the electrodes 563 and 564. Therefore, an inner area of the diaphragm 522 approaches the substrate 51, and the gap between the reflecting films 53 and 54 is reduced in accordance with the potential difference. In contrast, if application of the drive signals to the electrodes 563 and 564 is stopped, the gap between the reflecting films 53 and 54 is restored.

Therefore, the optical filter device 420 has a function of controlling the gap between the reflecting films 53 and 54 by adjusting a voltage of the drive signal to be applied to the electrodes 563 and 564, and selecting a wavelength of light to go out toward the cover glass 630.

In this manner, a configuration in which light intensity distribution with respect to a wavelength is obtained, that is, a configuration in which the color is measured is achieved by acquiring a voltage output from the light-receiving portion 430 while changing the voltage of the drive signal to the optical filter device 420, that is, while changing the wavelength of light to be extracted by the variable wavelength interference filter 5.

Figure 5A:
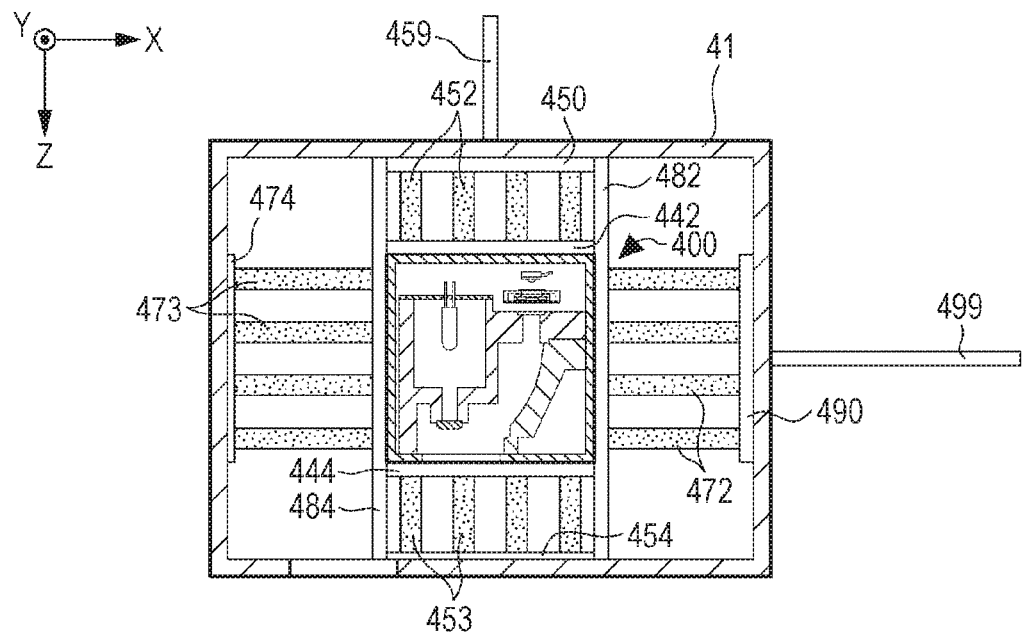
FIG. 5A is a drawing illustrating a positional relationship of the color measuring unit in the color measuring module while color measurement is not performed.
Figure 5B:
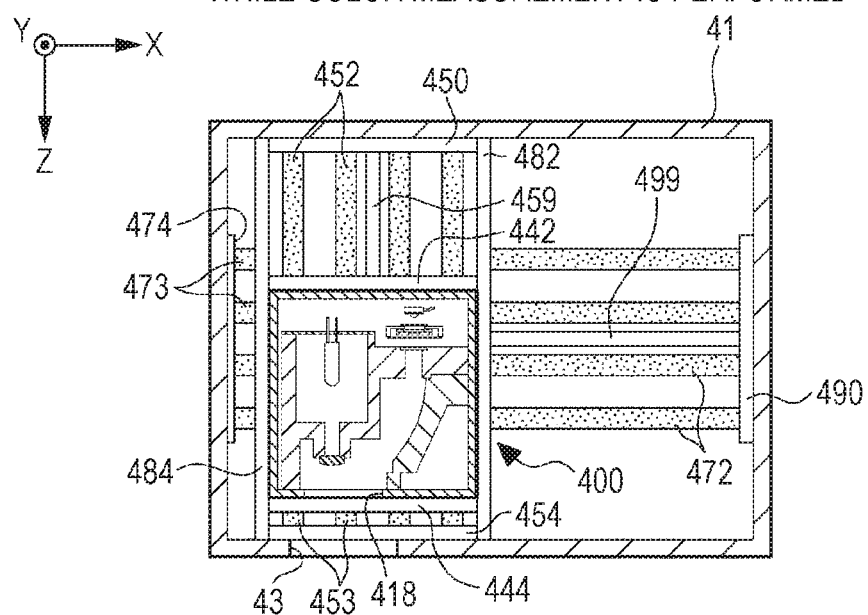
FIG. 5B is a drawing illustrating the positional relationship of the color measuring unit in the color measuring module while the color measurement is performed.

FIG. 5A is a drawing illustrating a positional relationship of the color measuring unit 400 with respect to the interior of the housing 41 in the color measuring module 40 while the color measurement is not performed, and FIG. 5B is a drawing illustrating the positional relationship of the color measuring unit 400 with respect to the interior of the housing 41 in the color measuring module 40 while the color measurement is performed.

When the color of the medium P is not measured (while the color is not measured), for example, during printing, during standby time for printing by the printing apparatus 1, and while being transported, the actuators 450 and 490 are not operated. Therefore, as illustrated in FIG. 5A, the color measuring unit 400 is suspended at a point where the biasing forces or the like of the shock-absorbing members 452, 453, 472, and 473 are balanced in the interior of the housing 41, and thus is protected from oscillations or impacts from the housing 41.

In the optical filter device 420, an internal space defined by the housing 601 and the cover glasses 630 and 640 is almost in a vacuum state. The reason for this is firstly to reduce a period of time required after the voltage of the drive signal is changed until the gap between the reflecting films 53 and 54 is stabilized, and secondly to suppress deterioration of the reflecting films 53 and 54, internal wiring, and the like.

However, when the internal space of the optical filter device 420 is brought substantially into the vacuum state, the space closed by the substrates 51 and 52 has difficulty in functioning as an air spring, and thus the substrate 52 (especially in an inner area of the diaphragm 522) is moved significantly by minute oscillations.

Therefore, if the optical filter device 420 is mounted on the carriage 20 without taking countermeasures, oscillations associated with the primary scanning of the carriage 20, or oscillations and impacts in association with transportation of the printing apparatus 1 may cause breakdown and erroneous operation of the optical filter device 420.

Therefore, in this embodiment, the shock-absorbing members 452 are provided between the actuator 450 and the holding plate 442, and the shock-absorbing members 453 are provided between the holding plate 444 and the slider 454. In other words, end surfaces of the shock-absorbing members 452 and 454 are provided respectively on X-Y planes which intersect a direction of the change of the gap of the variable wavelength interference filter 5 (Z-direction). Therefore, direct propagation of oscillations, impacts, and the like in the direction of the change of the gap (Z-direction) to the color measuring unit 400 is reduced.

In this embodiment, the shock-absorbing members 472 are provided between the actuator 490 and the contact plate 482, and the shock-absorbing members 473 are provided between the contact plate 484 and the fixing plate 474. In other words, end surfaces of the shock-absorbing members 472 and 474 are provided on Y-Z planes which intersect the scanning direction (X-direction) of the carriage 20, respectively. Therefore, oscillations, impacts, and the like generated when the carriage 20 is caused to scan in the X-direction are prevented from propagating directly to the color measuring unit 400.

In contrast, when measuring the color of the medium P (while the color measurement is performed), the actuators 450 and 490 operate as illustrated in FIG. 5B.

Specifically, the actuator 490 causes the operating member 499 to protrude toward a negative side in the X-direction. Accordingly, a distal end of the operating member 499 comes into contact with the contact plate 482 and moves the color measuring unit 400 toward the negative side in the X-direction. The actuator 450 causes the operating member 459 to protrude toward the positive side in the Z-direction. Accordingly, a distal end of the operating member 459 is brought into contact with the holding plate 442 and moves the color measuring unit 400 toward the positive side in the Z-direction.

The color measuring unit 400 then remains at rest at a position where the shock-absorbing members 453 and 473 are compressed to the minimum with respect to the housing 41. Since the housing 41 is immobile with respect to the carriage 20, the actuators 450 and 490 fix the color measuring unit 400 at the above described position with respect to the carriage 20.

At the position where the color measuring unit 400 remains at rest, the opening 418 provided in the case 401 and the opening 43 provided in the housing 41 face each other. In other words, outgoing light from the color measuring unit 400 (light source 410) passes through the openings 418 and 43 in this order, then follows a route of being reflected from the medium P, and then entering the color measuring unit 400 (reflecting mirror 414) via the openings 43 and 418. In FIG. 5B, it seems that the holding plate 444, the shock-absorbing member 453, and the slider 454 hinder the route. However, the route is secured by providing notches as needed or arranging the members adequately.

While the color measurement is performed, for example, the color measuring unit 400 measures the colors of a color chart formed on the medium P (color sample including rectangles in a plurality of the colors and arranged in a matrix pattern) in this order by the primary scanning of the carriage 20 and the transportation of the medium P. Specifically, a voltage change of the output signal of the light-receiving portion 430 is acquired while changing the gap between the reflecting films 53 and 54 for one color.

The primary scanning speed of the carriage 20 while the color measurement is performed is slower than the primary scanning speed during printing, and thus oscillations or the like generated by the primary scanning of the carriage 20 is small. Therefore, even though absorption of the impacts or the like by the shock-absorbing members 452, 453, 472, and 473 is not expected while the color measurement is performed, this is not a problem.

The invention is not limited to the embodiment described above. For example, various modifications and applications as described below are also possible. Modes of the modifications and applications described below may be a combination of optionally selected one or more of the modes.

Water repellent finishing such as coating with fluorine resin or the like may be applied to an outer surface of the window member 44 to prevent adherence of ink mist to an outer surface. In addition, for example, an inner surface of the window member 44 may be coated with a multi-layered dielectric film for blocking stray light or harmful rays and allowing visible light to transmit therethrough to form a sort of interference filter. The term "harmful rays" here means, for example, light having a wavelength which accelerates deteriorations of the respective parts of the color measuring unit 400.

A configuration in which an acceleration sensor or the like is mounted on the carriage 20, a platen gap in association with the transport of the carriage 20 is detected by the acceleration sensor or the like, and then an amount of protrusion of the operating member 459 caused by the actuator 450 based on the result of detection is suppressed so as to maintain an optical path length between the color measuring unit 400 and the medium P constant is also applicable.

The actuators 450 and 490 are not limited to a type which causes the operating members 459 and 499 to protrude, and any configurations may be employed as long as the opening 418 and the opening 43 are transported and fixed at positions facing each other while the color measurement is performed.

The entire disclosure of Japanese Patent Application No. 2014-258512 filed on Dec. 22, 2014 is expressly incorporated by reference herein.

What is claimed is:

1. A printing apparatus comprising:
   a discharging unit configured to discharge liquid onto a medium;
   a color measuring unit configured to measure a color of the medium on which the liquid has been discharged;
   a carriage on which the discharging unit and the color measuring unit are mounted; and
   a relative transporting unit configured to change positional relationship between the carriage and the medium relatively, wherein
   the color measuring unit includes a variable wavelength interference filter configured to change a gap between a first reflector and a second reflector, the first reflector and the second reflector face each other, and
   a shock-absorbing member is provided between the carriage and the color measuring unit.

2. The printing apparatus according to claim 1, wherein the shock-absorbing member is provided on a plane intersecting a direction from the first reflector to the second reflector.

3. The printing apparatus according to claim 1, wherein the shock-absorbing member is provided on a plane intersecting a scanning direction of the carriage.

4. The printing apparatus according to claim 1, further comprising:
   an actuator configured to fix the color measuring unit at a predetermined position with respect to the carriage while color measurement is performed by the color measuring unit.

* * * * *